US008823885B2

(12) United States Patent
Masuda et al.

(10) Patent No.: US 8,823,885 B2
(45) Date of Patent: Sep. 2, 2014

(54) PROJECTOR

(75) Inventors: Tomoharu Masuda, Suwa (JP); Takashi Endo, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 291 days.

(21) Appl. No.: 13/040,746

(22) Filed: Mar. 4, 2011

(65) Prior Publication Data

US 2011/0234928 A1 Sep. 29, 2011

(30) Foreign Application Priority Data

Mar. 23, 2010 (JP) ................. 2010-065840

(51) Int. Cl.
*G02F 1/1335* (2006.01)
*G03B 21/14* (2006.01)
*H04N 9/31* (2006.01)
*G03B 33/12* (2006.01)

(52) U.S. Cl.
CPC .............. *G03B 21/14* (2013.01); *H04N 9/3167* (2013.01); *G03B 33/12* (2013.01)
USPC ................................................ 349/8; 353/97

(58) Field of Classification Search
None
See application file for complete search history.

(56) References Cited

U.S. PATENT DOCUMENTS

| 6,877,865 | B2 | 4/2005 | English, Jr. et al. |
| 7,008,065 | B2 | 3/2006 | English, Jr. et al. |
| 7,055,966 | B2 | 6/2006 | Momose et al. |
| 7,643,053 | B2 | 1/2010 | Shimizu et al. |
| 7,773,163 | B2 | 8/2010 | Shimizu et al. |
| 8,237,876 | B2 | 8/2012 | Tan et al. |
| 2002/0171809 | A1 | 11/2002 | Kurtz et al. |
| 2002/0180932 | A1 | 12/2002 | Shimizu et al. |
| 2005/0024591 | A1 | 2/2005 | Lian et al. |
| 2006/0098283 | A1 | 5/2006 | Sato |
| 2006/0152687 | A1 | 7/2006 | Robinson |
| 2007/0030424 | A1* | 2/2007 | Shimizu et al. ............... 349/113 |
| 2007/0076133 | A1 | 4/2007 | Shimizu et al. |
| 2008/0158511 | A1 | 7/2008 | Takenaka et al. |
| 2011/0181801 | A1 | 7/2011 | Okumura |

FOREIGN PATENT DOCUMENTS

| CN | 1497334 A | 5/2004 |
| JP | A-11-281923 | 10/1999 |
| JP | A-2005-516249 | 6/2005 |
| JP | A-2006-113282 | 4/2006 |
| JP | A-2006-308787 | 11/2006 |

(Continued)

OTHER PUBLICATIONS

Apr. 19, 2011 Search Report issued in European Patent Application No. 11 15 8979.2.

*Primary Examiner* — Richard Kim
(74) *Attorney, Agent, or Firm* — Oliff PLC

(57) ABSTRACT

A projector includes: an illuminator that outputs illumination light; a light modulator including a liquid crystal panel and a structural birefringent polarization separation element having a polarization separation surface inclined away from a central axis of the illumination light, the light modulator modulating the illumination light from the illuminator; and a projection system that projects the light modulated by the light modulator, wherein the illumination light outputted from the illuminator has an angular distribution in a first direction, which is perpendicular to the central axis of the illumination light, smaller than the angular distribution in a second direction, which is perpendicular to the first direction and the central axis of the illumination light, and the polarization separation surface of the structural birefringent polarization separation element has a structure that is not periodic along the first direction but is periodic along the second direction.

7 Claims, 7 Drawing Sheets

(56) References Cited

FOREIGN PATENT DOCUMENTS

| JP | A-2007-79054 | 3/2007 |
| JP | A-2007-94399 | 4/2007 |
| JP | A-2007-212997 | 8/2007 |
| JP | A-2007-522491 | 8/2007 |
| JP | A-2008-275798 | 11/2008 |
| JP | A-2010-14926 | 1/2010 |
| WO | WO 2005/066691 A1 | 7/2005 |

* cited by examiner

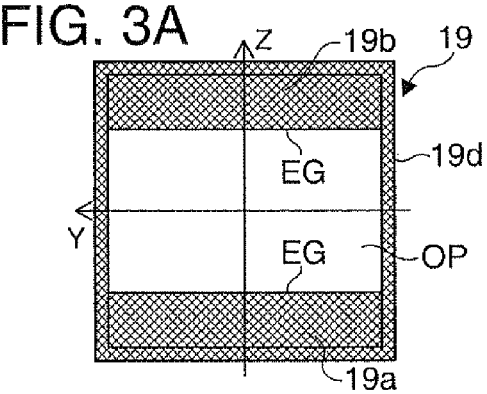
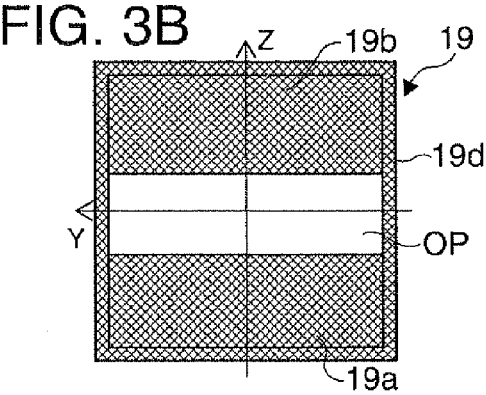
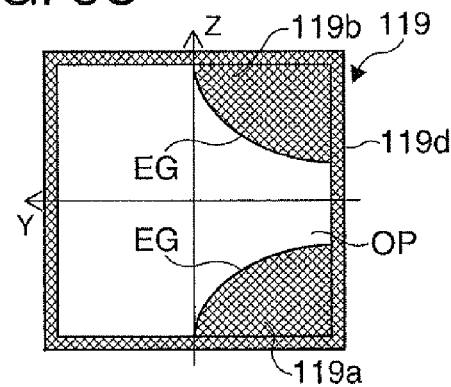
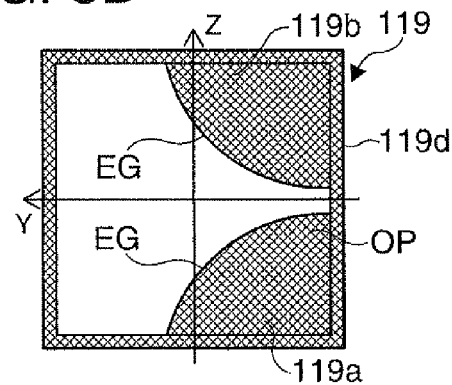
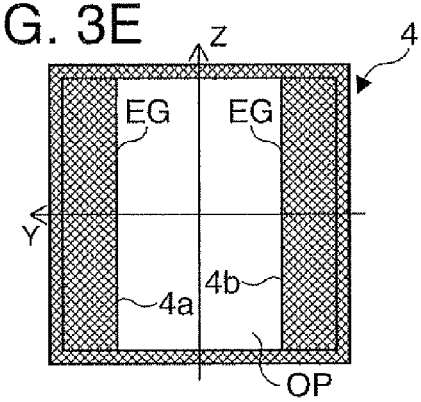
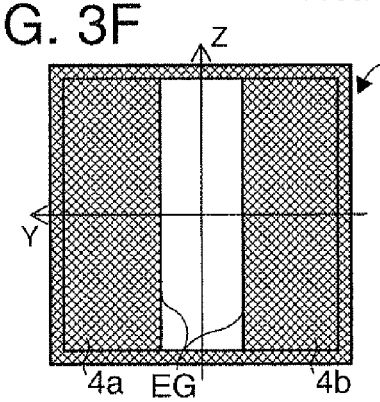
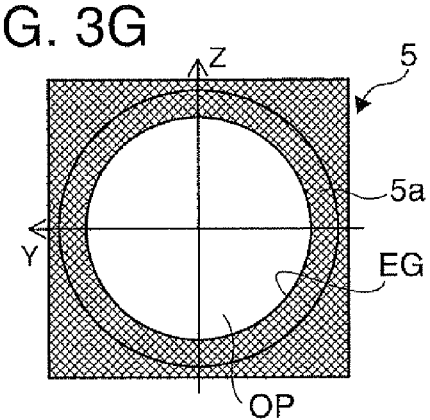
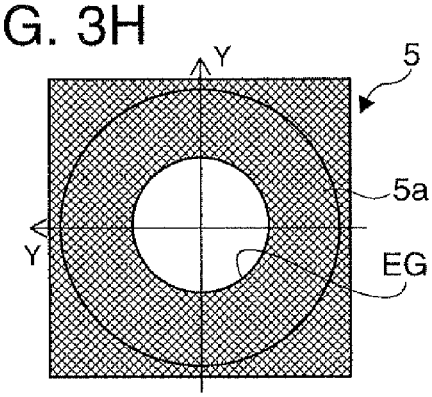

PROJECTOR

This application claims priority to JP 2010-065840 filed in Japan on Mar. 23, 2010, the entire disclosure of which is hereby incorporated by reference in its entirety.

BACKGROUND

1. Technical Field

The present invention relates to a projector that projects an image light flux modulated by a light modulator including a liquid crystal panel and a structural birefringent polarization separation element.

2. Related Art

There is a projector having a wire-grid polarization separation element disposed in a position facing a reflective liquid crystal panel with the wire-grid polarization separation element inclined to the optical axis by 45 degrees (see JP-A-2008-275798). In the projector, polarized light passing through the wire-grid polarization separation element is incident on the reflective liquid crystal panel, and the light modulated by and reflected off the reflective liquid crystal panel is reflected off the wire-grid polarization separation element. In this way, the reflected polarized light is separated from the incident polarized light.

There is another projector including a diaphragm mechanism having pivotal light-blocking members that adjust the amount of attenuation of an illumination light flux (see JP-A-2006-308787). In this projector, slit-shaped openings or any other suitably shaped openings are formed in each of the light-blocking members so that part of the illumination light flux passing through the light-blocking members is relatively uniform even when the degree of blockage of the illumination light flux is the highest.

In the projector described in JP-A-2008-275798, however, improvement in contrast of a projected image is insufficient because no consideration is given to the angular distribution of the illumination light flux. That is, the present inventor has ascertained that the angular distribution of the illumination light flux affects the contrast of a projected image in the projector using a wire-grid polarization separation element described in JP-A-2008-275798 and found that the contrast may still be improved when the angular distribution of the illumination light flux is set appropriately.

In the projector described in JP-A-2006-308787, on the other hand, the uniformity of the illumination light is relatively readily maintained in a light level adjustment process, but the contrast of a projected image is not always readily maintained or improved.

SUMMARY

An advantage of some aspects of the invention is to provide a projector capable of improving the contrast of a projected image or reducing decrease in contrast in a light level adjustment process.

A projector according to a first aspect of the invention includes an illuminator that outputs illumination light, a light modulator including a liquid crystal panel and a structural birefringent polarization separation element having a polarization separation surface inclined away from a central axis of the illumination light, the light modulator modulating the illumination light from the illuminator, and a projection system that projects the light modulated by the light modulator. The illumination light outputted from the illuminator has an angular distribution in a first direction, which is perpendicular to the central axis of the illumination light, smaller than the angular distribution in a second direction, which is perpendicular to the first direction and the central axis of the illumination light, and the polarization separation surface of the structural birefringent polarization separation element has a structure that is not periodic along the first direction but is periodic along the second direction. The first and second directions are defined with reference to an unfolded optical path.

According to the projector described above, since the illuminator outputs illumination light whose angular distribution in the first direction is smaller than the angular distribution in the second direction, and the polarization separation surface of the structural birefringent polarization separation element has a structure that is not periodic along the first direction but is periodic along the second direction, the illumination light incident on the structural birefringent polarization separation element has an angular range in the first direction smaller than the angular range in the second direction. As a result, the structural birefringent polarization separation element can provide excellent polarization separation characteristics, and light leakage through the structural birefringent polarization separation element can therefore be reduced, whereby the contrast of a projected image can be increased.

According to a specific embodiment or aspect of the invention, in the projector described above, the illuminator may include a light level adjuster having a movable light blacker for adjusting the angular distribution of the illumination light. In this case, the illuminator including a movable light blocker can adjust the angular distribution of the illumination light, whereby the brightness of a projected image can be increased or decreased while the contrast thereof is improved.

According to one aspect of the invention, in the projector described above, the illuminator may include a fixed diaphragm having a light blocker for limiting the angular distribution of the illumination light. In this case, the fixed diaphragm having a light blacker can limit the angular distribution of the illumination light incident on the structural birefringent polarization separation element in a direction effective in preventing light leakage, whereby the contrast of a projected image can be always increased.

According to one aspect of the invention, in the projector described above, the light blocker may have an opening whose width in the first direction changes with the position in the second direction. In this case, even when the degree of leakage of the illumination light incident on the structural birefringent polarization separation element changes with the position in the second direction or the periodic direction, the illumination light incident on the structural birefringent polarization separation element can have an angular distribution that cancels the difference in light leakage, whereby the contrast of a projected image can be uniformly improved.

According to one aspect of the invention, the projector described above may further include a plurality of light modulators in addition to the light modulator, a color separation/light guiding section that separates the illumination light outputted from the illuminator into red light, green light and blue light, guides the green light to the light modulator, and guides the red light and the blue light to the plurality of other light modulators, and a light combining section that combines the green light modulated by the light modulator with the red light and the blue light modulated by the plurality of other light modulators and causes the combined light to enter the projection system. In this case, the contrast of a projected image can be increased with spectral luminous efficiency of human eye for at least the green light prioritized.

A projector according to a second aspect of the invention includes an illuminator that outputs illumination light, a light modulator including a liquid crystal panel and a structural birefringent polarization separation element having a polarization separation surface inclined away from a central axis of the illumination light, the light modulator modulating the illumination light from the illuminator, and a projection system that projects the light modulated by the light modulator. The polarization separation surface of the structural birefringent polarization separation element has a structure that is not periodic along a first direction, which is perpendicular to the central axis of the illumination light, but is periodic along a second direction, which is perpendicular to the central axis of the illumination light and the first direction, and the projection system transmits image light whose angular distribution in the first direction is smaller than the angular distribution in the second direction.

According to the projector described above, since the polarization separation surface of the structural birefringent polarization separation element has a structure that is not periodic along a first direction, which is perpendicular to the central axis of the illumination light, but is periodic along a second direction, which is perpendicular to the central axis of the illumination light and the first direction, and the projection system transmits image light whose angular distribution in the first direction is smaller than the angular distribution in the second direction, the image light extracted from the polarization separation surface of the structural birefringent polarization separation element via the projection system has an angular range in the first direction smaller than the angular range in the second direction. In this way, light leakage through the structural birefringent polarization separation element less affects a projected image, whereby the contrast thereof can be increased.

According to a specific embodiment or aspect of the invention, in the projector described above, the projection system may include a diaphragm having a movable light blacker for adjusting the angular distribution of the projected image light. In this case, the diaphragm having a movable light blocker can limit the angular distribution of the illumination light, whereby the contrast of a projected image can be increased to a desired level.

BRIEF DESCRIPTION OF THE DRAWINGS

The invention will be described with reference to the accompanying drawings, wherein like numbers reference like elements.

FIGS. 3A and 3B describe the shape and action of light-blockers, FIGS. 3C and 3D describe the shape and action of light-blockers in a variation, FIGS. 3E and 3F describe the shape and action of light-blockers in Comparative Example 1, and FIGS. 3G and 3H describe the shape and action of light-blockers in Comparative Example 2.

DESCRIPTION OF EXEMPLARY EMBODIMENTS

First Embodiment

Figure 1:
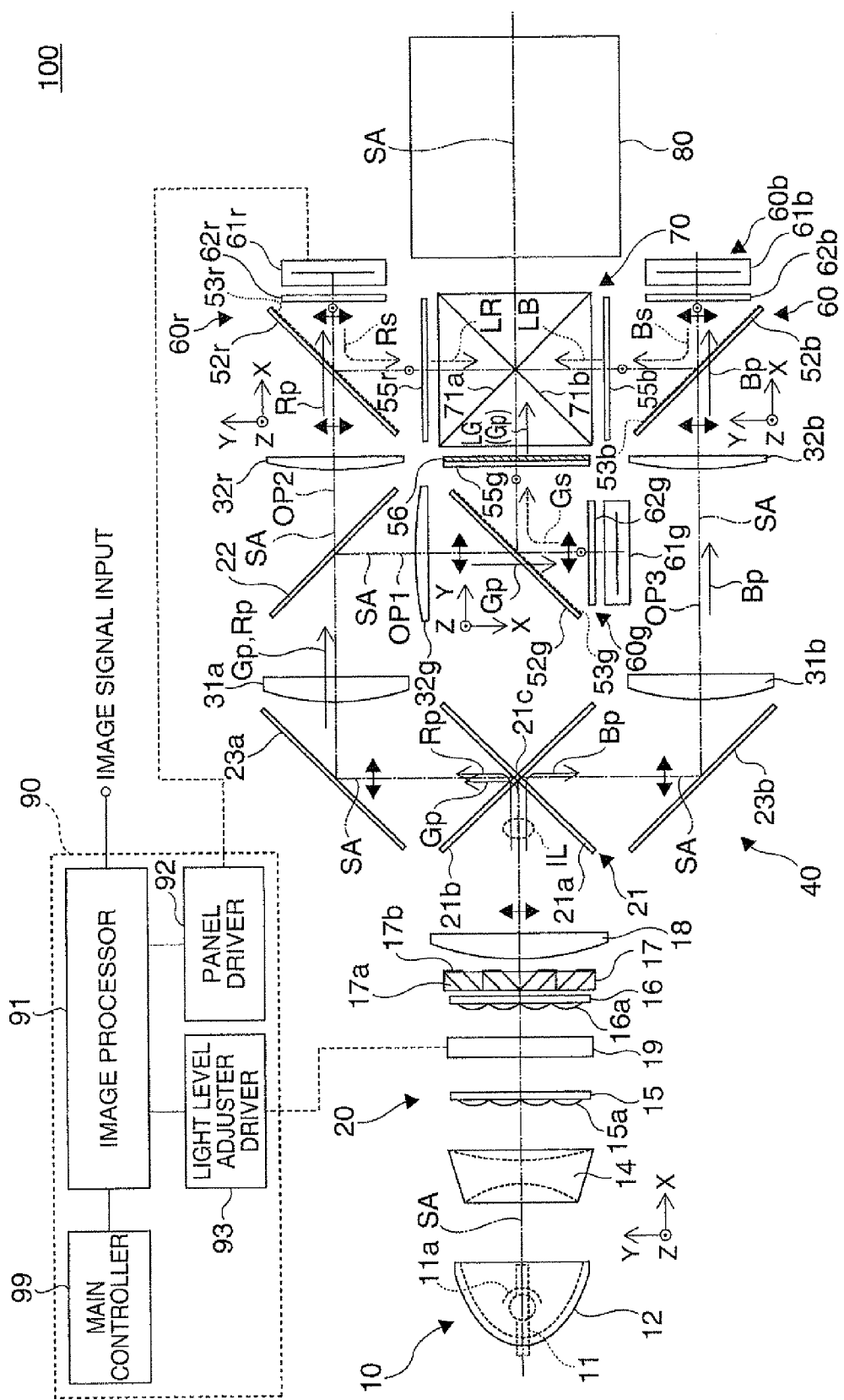
FIG. 1 is a plan view for describing a projector according to a first embodiment.

A projector according to a first embodiment of the invention will be described below with reference to FIG. 1 and other figures. In FIG. 1, X, Y, and Z represent three coordinate axes that form a three-dimensional orthogonal coordinate system. The X direction represents a direction always parallel to a system optical axis SA corresponding to a central axis of a light flux in the portion from an illuminator 20 to a projection system 80. The Z direction represents a direction always perpendicular to the plane of view and oriented upward, and the Y direction is oriented leftward when viewed in the direction in which an optical path extends or viewed in the direction facing the downstream side of the optical path.

A projector 100 shown in FIG. 1 includes an illuminator 20 that outputs illumination light, a color separation/light guiding section 40 that separates the illumination light from the illuminator 20 into green, red, and blue, three color light fluxes, a light modulating section 60 that modulates the three color light fluxes having exited from the color separation/light guiding section 40, a light combining section 70 that combines the color image light fluxes having exited from the light modulating section 60, a projection system 80 that projects the image light combined in the light combining section 70, and a control unit 90 that oversees and controls the actions of the sections described above. Among the sections described above, the portion ranging from the illuminator 20 to the light combining section 70 is accommodated in an optical part housing (not shown). In the projector 100, the system optical axis SA corresponding to the central axis of the light flux in the portion from the illuminator 20 to the projection system 80 lies two-dimensionally in parallel to the XY plane (reference plane parallel to the plane of view) perpendicular to the Z axis.

In the thus configured projector 100, the illuminator 20 includes a light source apparatus 10, a concave lens 14, first and second lens arrays 15, 16, a polarization converter 17, a superimposing lens 18, and a light level adjuster 19. Among the components described above, the light source apparatus 10 is a light source that emits an illumination light flux and includes an arc tube 11, such as a high-pressure mercury lamp, a sub-mirror 11a that redirects the light flux emitted forward from the arc tube 11, that is, toward the superimposing lens 18 and other components, back to the arc tube 11, and a concave mirror 12 that collects the light flux emitted backward from the arc tube 11 and redirects the collected light flux forward. The concave lens 14 serves to parallelize the light flux from the light source apparatus 10 but can be omitted when the concave mirror is, for example, a parabolic mirror. The first lens array 15 is formed of a plurality of element lenses 15a arranged in a matrix and divides the light flux having exited through the lens 14 in correspondence with the contours of the element lenses 15a. The second lens array 16 is formed of a plurality of element lenses 16a arranged in correspondence with the plurality of element lenses 15a and adjusts the divergence of the divided light fluxes from the element lenses 15a. The polarization converter 17 is a polarization conversion section that converts the divided light fluxes having exited through the lens array 16 only into linearly polarized light fluxes having a plane of polarization parallel to a second direction (the Y direction in the present embodiment) and supplies the linearly polarized light fluxes to a downstream optical system. The superimposing lens 18 causes as appropriate illumination light IL, which is formed of the linearly polarized light fluxes having passed through the polarization converter 17, to converge as a whole, achieving superimposed illumination on areas to be illuminated, that is, liquid crystal light valves 60g, 60r, and 60b for the respective colors provided in the light modulating section 60. That is, the illumination light IL having passed through the lens arrays 15, 16 and the superimposing lens 18 passes through the color separation/light guiding section 40, which will be described below in detail, and uniformly illuminates liquid crystal panels 61g, 61r, and 61b for the respective colors provided in the light modulating section 60.

The polarization converter 17 includes a plurality of prism elements 17a, each of which has a structure in which a PBS and a mirror are incorporated. The polarization converter 17 further includes a plurality of wave plates 17b attached onto one of the surfaces of the respective prism elements 17a, that is, a light-exiting surface. Each of the prism elements 17a is a rod-shaped member extending in the Z direction, and the plurality of prism elements 17a are arranged in the Y direction to form a plate extending as a whole in parallel to the YZ plane. The illumination light IL (Gp, Rp, and Bp), which is the light linearly polarized in the second direction corresponding to the Y direction as described above, exits through the polarization converter 17.

Figure 2:
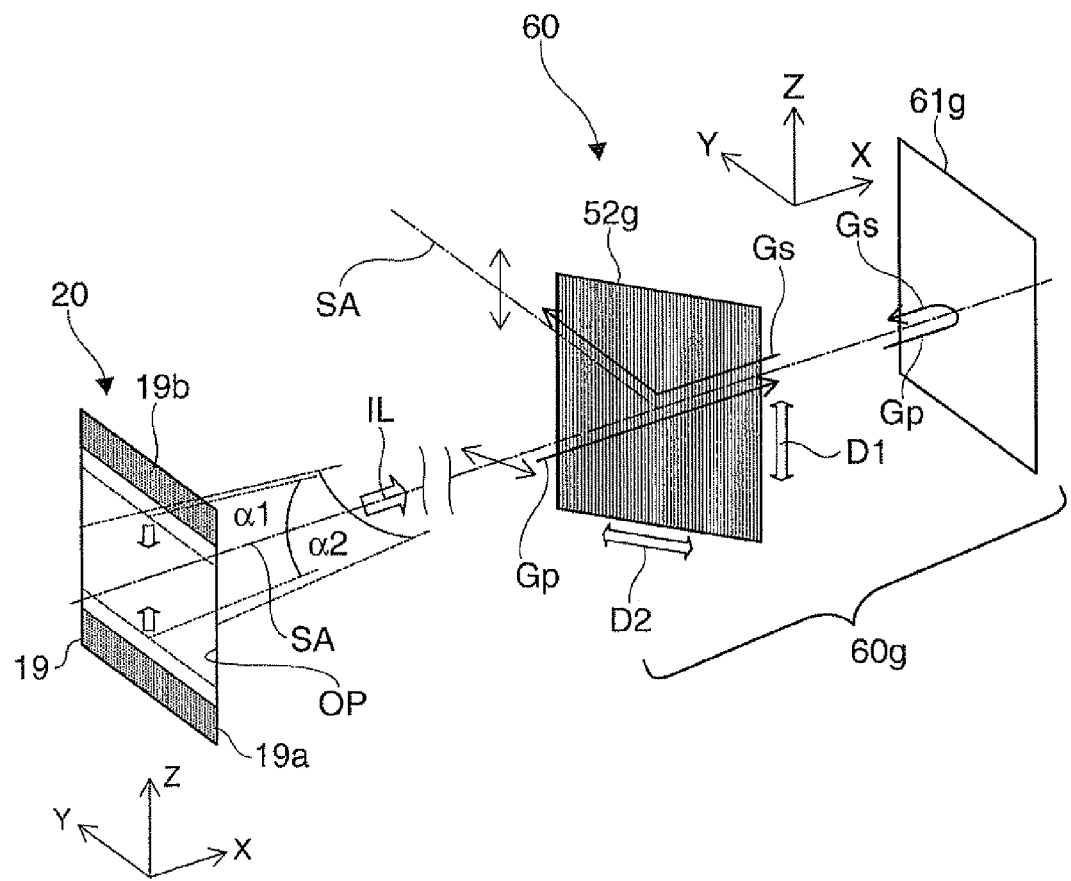
FIG. 2 is a perspective view showing an unfolded optical path for describing the structure and action of a light level adjuster in an illumination system.

The light level adjuster 19 is disposed, for example, between the first lens array 15 and the second lens array 16. The light level adjuster 19 has a pair of light blockers 19a and 19b shown in FIG. 2 and is opened or closed by moving the light blockers 19a and 19b away from each other or toward each other. The movable light blockers 19a and 19b can gradually block the illumination light IL outputted from the illuminator 20 in such a way that the portion of the illumination light IL that is spaced apart from the system optical axis SA in the illuminator 20, that is, an outermost portion of the illumination light IL is preferentially blocked. In this way, the amount of illumination light can be adjusted stepwise or continuously. In the opening and closing actions, which will be described later in detail, the light blockers 19a and 19b are moved in the Z direction, which coincides with a first direction perpendicular to the plane of polarization of the illumination light IL having exited through the polarization converter 17. The illumination light IL outputted from the illuminator 20 is distributed in a relatively symmetric manner with respect to the system optical axis SA, which is the central axis of the illumination light, but an incident angle range α1 in the vertical XZ cross section is slightly narrower than an incident angle range α2 in the horizontal XY cross section when the light level adjuster is opened. The incident angle range α1 and the incident angle range α2 represent incident angle ranges of the illumination light IL when it illuminates the liquid crystal light valve 60g and the other liquid crystal light valves and practically correspond to the width of an opening OP of the light level adjuster 19 in the Z direction and the width of the opening OP in the Y direction, respectively. In FIG. 2, the second lens array 16, the superimposing lens 18, and other components are omitted for ease of illustration. When the opening OP of the opened light level adjuster 19 is gradually closed, the incident angle range α1 in the vertical XZ cross section becomes narrower than that in the opened state and much narrower than the incident angle range α2 in the horizontal XY cross section. That is, when the light level adjuster 19 is opened, the illumination light IL outputted from the illuminator 20 is set with reference to the system optical axis SA, which is the central axis of the illumination light, in such a way that the angular distribution in the first direction (the Z direction in the present embodiment), which is perpendicular to the system optical axis SA, is smaller than the angular distribution in the second direction (the Y direction in the present embodiment), which is also perpendicular to the system optical axis SA. Further, when the light level adjuster 19 is gradually changed from the opened state to the closed state, the angular distribution in the first direction gradually decreases and becomes smaller than the angular distribution in the initial opened state, and the difference in angular distribution between the first and second directions increases. The static contrast of a projected image can thus be increased by increasing the amount of light blocked by the light level adjuster 19, that is, the amount of light attenuation, which will be described later in detail. When video images are of interest, the dynamic contrast of the video images can also be improved by operating the light level adjuster 19 under the control of the control unit 90 to increase or decrease the amount of light passing through the light level adjuster 19 in accordance with the respective projected images.

FIG. 1 is now referred again. The color separation/light guiding system 40 includes a cross dichroic mirror 21, a dichroic mirror 22, optical-path deflecting mirrors 23a and 23b, first lenses 31a and 31b, and second lenses 32g, 32b, and 32r. The cross dichroic mirror 21 includes a first dichroic mirror 21a and a second dichroic mirror 21b. The first and second dichroic mirrors 21a, 21b are perpendicular to each other and an intersection axis 21c where the two dichroic mirrors intersect extends in the Z direction. The first dichroic mirror 21a, for example, reflects the green (G) light and the red (R) light contained in the illumination light IL and transmits the remaining blue (B) light. The second dichroic mirror 21b reflects the blue (B) light and transmits the green (G) light and the red (R) light. The dichroic mirror 22, for example, reflects the green (G) light out of the incident green light (G) and red light (R) and transmits the remaining red (R) light. In this way, the green light Gp, the red light Rp, and the blue light Bp contained in the illumination light IL outputted from the illuminator 20 are guided to first, second, and third optical paths OP1, OP2, OP3, respectively, and incident on different objects to be illuminated. Specifically, the illumination light IL from the illuminator 20 is incident on the cross dichroic mirror 21. The green light Gp is reflected off and deflected by the first dichroic mirror 21a of the cross dichroic mirror 21, travels via the optical-path deflecting mirror 23a and other components, is further reflected off and deflected by the dichroic mirror 22, and is incident on a polarization separation element 52g in the liquid crystal light valve 60g. The red light Rp is reflected off and deflected by the first dichroic mirror 21a of the cross dichroic mirror 21, separated by the dichroic mirror 22 when passing through it, and incident on a polarization separation element 52r in the liquid crystal light valve 60r. The blue light Bp is reflected off and deflected by the second dichroic mirror 21b of the cross dichroic mirror 21, travels via the optical-path deflecting mirror 23b and other components, and is incident on a polarization separation element 52b in the liquid crystal light valve 60b.

The first lens 31a and the second lens 32g disposed along the first optical path OP1 are provided to adjust the angular state of the green light Gp to be incident on the liquid crystal panel 61g. The first lens 31a and the second lens 32r disposed along the second optical path OP2 are provided to adjust the angular state of the red light Rp to be incident on the liquid crystal panel 61r. The first lens 31b and the second lens 32b disposed along the third optical path OP3 are provided to adjust the angular state of the blue light Bp to be incident on the liquid crystal panel 61b.

The light modulating section 60 includes the three liquid crystal light valves 60g, 60r, and 60b in correspondence with the three optical paths OP1, OP2, and OP3 for the respective colors described above. Each of the liquid crystal light valves 60g, 60r, and 60b is a non-luminous light modulator that modulates the spatial distribution of the intensity of the incident illumination light.

The liquid crystal light valve 60g for G light disposed in the first optical path OP1 includes the liquid crystal panel 61g illuminated with the green light Gp, a retardation compensator 62g that corrects any phase shift at the liquid crystal panel 61g, the polarization separation element 52g that controls the input and output of the green light to and from the liquid crystal light valve 60g, and a cleanup polarizer 55g that supplements the polarization separation characteristics of the polarization separation element 52g. The liquid crystal panel 61g is a reflective liquid crystal panel including a backside reflection plate that causes the modulated light to exit through the surface on which the illumination light has been incident. The liquid crystal panel 61g is illuminated with the green light Gp having uniform in-plane illuminance after it is reflected off the first dichroic mirror 21a and the dichroic mirror 22. The liquid crystal panel 61g, although not described using illustration, includes a light transmissive substrate having transparent electrodes and other components, a drive substrate having reflective pixel electrodes and other components, and a liquid crystal layer sealed between the light transmissive substrate and the drive substrate. The polarization separation element 52g includes a light-exiting-side pattern layer 53g as a polarization separation surface. The polarization separation element 52g is a structural birefringent optical element, specifically, a wire-grid polarization separation element including the light-exiting-side pattern layer 53g in which a stripe-shaped grid made of a conductive material that works as the polarization separation surface is formed on a light transmissive flat body plate. The polarization separation surface, that is, the light-exiting-side pattern layer 53g is not perpendicular to the system optical axis SA but is inclined thereto around the Z axis by 45 degrees. The light-exiting-side pattern layer 53g has a structure that is not periodic along the first direction but is periodic along the second direction. The light-exiting-side pattern layer 53g selectively transmits light linearly polarized in the second direction (Y direction in this case) described above, which is the incident green light Gp, and guides the transmitted light to the liquid crystal panel 61g. The liquid crystal panel 61g changes the polarization of the green light Gp incident thereon in accordance with an image signal and reflects the resultant light toward the polarization separation element 52g. The light-exiting-side pattern layer 53g of the polarization separation element 52g then selectively reflects only the light whose plane of polarization coincides with the first direction (Z direction), which is the light modulated by the liquid crystal panel 61g. Further, providing the retardation compensator 62g increases the extinction ratio on the light-exiting side of the polarization separation element 52g and improves the contrast of the modulated light accordingly.

In the liquid crystal light valve 60g, the second direction (Y direction), which corresponds to the plane of polarization of the green light Gp to be incident as the illumination light on the polarization separation element 52g, is substantially parallel to the plane of incidence (a plane parallel to the XY plane) of the green light Gp to be incident on the light-exiting-side pattern layer 53g. That is, the green light Gp incident on the light-exiting-side pattern layer 53g is mostly P-polarized light and efficiently passes therethrough. On the other hand, the first direction (z direction), which corresponds to the plane of polarization of the green light Gs that has exited from the liquid crystal panel 61g as the image light and will be reflected off the polarization separation element 52g, is substantially perpendicular to the plane of incidence (a plane parallel to the XY plane) of the green light Gs to be incident on the light-exiting-side pattern layer 53g. That is, the green light Gs, which is the light modulated by the liquid crystal panel 61g, is S-polarized light, which is efficiently reflected off the light-exiting-side pattern layer 53g.

The thus configured polarization separation element 52g has a periodic direction D2 and a non-periodic direction D1 defined along a principal plane thereof, as shown in FIG. 2. The light-exiting-side pattern layer 53g has a periodic structure along the periodic direction D2, and the non-periodic direction D1 is perpendicular to the periodic direction D2. The portion of the green light Gp that is incident on the polarization separation element 52g but inclined away from the system optical axis SA, which is the central axis, toward the periodic direction D2 or the Y direction passes therethrough with the polarization characteristics relatively intact. Similarly, the image-forming green light Gs reflected off the liquid crystal panel 61g is incident on the polarization separation element 52g and reflected and outputted with the polarization characteristics relatively intact. On the other hand, when the portion of the green light Gp that is inclined away from the system optical axis SA, which is the central axis, toward the non-periodic direction D1 or the Z direction is incident on the polarization separation element 52g, the polarization characteristics thereof is slightly degraded in accordance with the degree of inclination when the green light Gp passes through the polarization separation element 52g. Similarly, the image-forming green light Gs reflected off the liquid crystal panel 61g is incident on the polarization separation element 52g and reflected and outputted with the polarization characteristics slightly degraded in accordance with the degree of inclination. Specifically, the polarization separation element 52g is configured in such a way that light passing therethrough and light reflected therefrom are perpendicular to each other in terms of direction of polarization. When light inclined away from the system optical axis SA toward the non-periodic direction D1 is incident on the polarization separation element 52g and passes therethrough or reflected therefrom, however, the incident light becomes elliptically polarized light according to the inclination angle, whereas when light inclined away from the system optical axis SA toward the periodic direction D2 is incident on the polarization separation element 52g and passes therethrough or reflected therefrom, the incident light becomes desired linearly polarized light.

When the green light Gp to be incident on the polarization separation element 52g passes through the opened light level adjuster 19 shown in FIG. 3A, the angular distribution of the green light Gp in the first direction or the Z direction, which is perpendicular to the reference system optical axis SA (corresponding to the incident angle range α1), is smaller than the angular distribution in the second direction or the Y direction (corresponding to the incident angle range α2), which is perpendicular to the first direction (Z direction), as clearly seen from FIG. 2. Further, when the state of the light level adjuster 19 is changed from the opened state shown in FIG. 3A to a half-blocked state shown in FIG. 3B, the angular distribution in the first direction or the Z direction is further smaller than the angular distribution in the second direction or the Y direction, as clearly seen from FIG. 2. That is, in the opened state shown in FIG. 3A, green light Gp whose angular distribution in the non-periodic direction D1 or the Z direction is slightly smaller than the angular distribution in the periodic direction D2 or the Y direction is incident on the polarization separation element 52g, whereas in the half-blocked state shown in FIG. 3B, green light Gp whose angular distribution in the non-periodic direction D1 or the Z direction is greatly smaller than the angular distribution in the periodic direction D2 or the Y direction is incident on the polarization separation element 52g. That is, when the state of the light level adjuster 19 is changed from the opened state shown in FIG. 3A to the half-blocked state shown in FIG. 3B, the green light Gp incident on the polarization separation element 52g has an angular distribution in the non-periodic direction D1 (Z direction) smaller than the angular distribution in the periodic direction D2 (Y direction). As described above, when light inclined away from the system optical axis SA toward the non-periodic direction D1 (Z direction) is incident on the polarization separation element 52g and passes therethrough or reflected therefrom, the incident light becomes elliptically polarized light according to the inclination angle, and in this case desired polarization separation characteristics cannot be obtained. It is, however, conceivable that the polarization separation characteristics of the polarization separation element 52g are improved and contrast performance of the liquid crystal light valve 60g is enhanced accordingly by changing the state of the light level adjuster 19 from the opened state shown in FIG. 3A to the half-blocked state shown in FIG. 33 to relatively narrow the angular distribution of the illumination light IL in the non-periodic direction D1 (Z direction).

The liquid crystal light valve 60r for red light disposed in the second optical path OP2 has the same structure as that of the liquid crystal light valve 60g for green light. That is, the liquid crystal light valve 60r includes the liquid crystal panel 61r illuminated with the red light Rp, a retardation compensator 62r that corrects any phase shift at the liquid crystal panel 61r, the polarization separation element 52r that transmits and reflects the red light Rp toward the liquid crystal panel 61r and red light Rs from the liquid crystal panel 61r respectively depending on the polarization of the red light to control the input and output of the red light Rp, Rs to and from the liquid crystal light valve 60r, and a cleanup polarizer 55r that supplements the polarization separation characteristics of the polarization separation element 52r. The liquid crystal panel 61r is a reflective liquid crystal panel including a back-side reflection plate that causes the modulated light to exit through the surface on which the illumination light has been incident. The liquid crystal panel 61r is illuminated with the red light Rp having uniform in-plane illuminance after it is reflected off the first dichroic mirror 21a and passes through the dichroic mirror 22. The polarization separation element 52r is inclined away from the system optical axis SA and includes a light-exiting-side pattern layer 53r as a polarization separation surface. The polarization separation element 52r is a wire-grid polarization separation element or any other structural birefringent optical element, as in the case of the polarization separation element 52g, and selectively transmits light linearly polarized in the second direction (Y direction in this case) described above, which is the incident red light Rp, and guides the transmitted light to the liquid crystal panel 61r. The liquid crystal panel 61r changes the polarization of the red light Rp incident thereon in accordance with an image signal and reflects the resultant light toward the polarization separation element 52r. The light-exiting-side pattern layer 53r of the polarization separation element 52r then selectively reflects only the light linearly polarized in the first direction, which is the light modulated by the liquid crystal panel 61r. Further, providing the retardation compensator 62r increases the extinction ratio on the light-exiting side of the polarization separation element 52r and improves the contrast of the modulated light accordingly.

In the liquid crystal light valve 60r, the second direction (Y direction), which corresponds to the plane of polarization of the red light Rp to be incident as the illumination light on the polarization separation element 52r is as a whole substantially parallel to the plane of incidence (a plane parallel to the XY plane) of the red light Rp to be incident on the light-exiting-side pattern layer 53r. That is, the red light Rp incident on the light-exiting-side pattern layer 53r is mostly P-polarized light and efficiently passes therethrough. On the other hand, the first direction (Z direction), which corresponds to the plane of polarization of the red light Rs that has exited from the liquid crystal panel 61r as the image light and will be reflected off the polarization separation element 52r, is substantially perpendicular to the plane of incidence (a plane parallel to the XY plane) of the red light Rs to be incident on the light-exiting-side pattern layer 53r. That is, the red light Rs, which is the light modulated by the liquid crystal panel 61r, is S-polarized light, which is efficiently reflected off the light-exiting-side pattern layer 53r.

When the red light Rp to be incident on the polarization separation element 52r passes through the opened light level adjuster 19 shown in FIG. 3A, the angular distribution of the red light Rp in the first direction or the Z direction, which is perpendicular to the reference system optical axis SA, is smaller than the angular distribution in the second direction or the Y direction. When the state of the light level adjuster 19 is changed from the opened state shown in FIG. 3A to the half-blocked state shown in FIG. 3B, the angular distribution in the first direction or the Z direction is further smaller than the angular distribution in the second direction or the Y direction. That is, when the state of the light level adjuster 19 is changed from the opened state shown in FIG. 3A to the half-blocked state shown in FIG. 3B, the red light Rp incident on the polarization separation element 52r has an angular distribution in the non-periodic direction D1 (Z direction) smaller than the angular distribution in the periodic direction D2 (Y direction). It is therefore also conceivable in the case of the red light Rp that the polarization separation characteristics of the polarization separation element 52r are improved and the contrast performance of the liquid crystal light valve 60r is enhanced accordingly in the half-blocked state shown in FIG. 3B as compared with those in the opened state shown in FIG. 3A, as in the description of the polarization separation element 52g.

The liquid crystal light valve 60b for blue light disposed in the third optical path OP3 has the same structure as that of the liquid crystal light valve 60g for green light. That is, the liquid crystal light valve 60b includes the liquid crystal panel 61b illuminated with the blue light Bp, a retardation compensator 62b that corrects any phase shift at the liquid crystal panel 61b, the polarization separation element 52b that transmits and reflects the blue light Bp toward the liquid crystal panel 61b and blue light Bs from the liquid crystal panel 61b respectively depending on the polarization of the blue light to control the input and output of the blue light Bp, Bs to and from the liquid crystal light valve 60b, and a cleanup polarizer 55b that supplements the polarization separation characteristics of the polarization separation element 52b. The liquid crystal panel 61b is a reflective liquid crystal panel including a back-side reflection plate that causes the modulated light to exit through the surface on which the illumination light has been incident. The liquid crystal panel 61b is illuminated with the blue light Bp having uniform in-plane illuminance after it is reflected off the second dichroic mirror 21b. The polarization separation element 52b is inclined away from the system optical axis SA and includes a light-exiting-side pattern layer 53b as a polarization separation surface. The polarization separation element 52b is a wire-grid polarizing plate or any other structural birefringent optical element, as in the case of the polarization separation element 52g, and selectively transmits light linearly polarized in the second direction (Y direction in this case) described above, which is the incident, blue light Bp, and guides the transmitted light to the liquid crystal panel 61b. The liquid crystal panel 61b changes the polarization of the blue light Bp incident thereon in accordance with an image signal and reflects the resultant light toward the polarization separation element 52b. The light-exiting-side pattern layer 53b of the polarization separation element 52b then selectively reflects only the light linearly polarized in the first direction, which is the light modulated by the liquid crystal panel 61b. Further, providing the retardation compensator 62b increases the extinction ratio on the light-exiting side of the polarization separation element 52b and improves the contrast of the modulated light accordingly.

In the liquid crystal light valve 60b, the second direction (Y direction), which corresponds to the plane of polarization of the blue light Bp to be incident as the illumination light on the polarization separation element 52b is as a whole substantially parallel to the plane of incidence (a plane parallel to the XY plane) of the blue light Bp to be incident on the light-exiting-side pattern layer 53b. That is, the blue light Bp incident on the light-exiting-side pattern layer 53b is mostly P-polarized light and efficiently passes therethrough. On the other hand, the first direction (Z direction), which corresponds to the plane of polarization of the blue light Bs that has exited from the liquid crystal panel 61b as the image light and will be reflected off the polarization separation element 52b is substantially perpendicular to the plane of incidence (a plane parallel to the XY plane) of the blue light Bs to be incident on the light-exiting-side pattern layer 53b. That is, the blue light Bs, which is the light modulated by the liquid crystal panel 61b, is substantially S-polarized light, which is efficiently reflected off the light-exiting-side pattern layer 53b.

When the blue light Bp to be incident on the polarization separation element 52b passes through the opened light level adjuster 19 shown in FIG. 3A, the angular distribution of the blue light Bp in the first direction or the Z direction, which is perpendicular to the reference system optical axis SA, is smaller than the angular distribution in the second direction or the Y direction. When the state of the light level adjuster 19 is changed from the opened state shown in FIG. 3A to the half-blocked state shown in FIG. 3B, the angular distribution in the first direction or the Z direction is further smaller than the angular distribution in the second direction or the Y direction. That is, when the state of the light level adjuster 19 is changed from the opened state shown in FIG. 3A to the half-blocked state shown in FIG. 3B, the blue light Bp incident on the polarization separation element 52b has an angular distribution in the non-periodic direction D1 (Z direction) smaller than the angular distribution in the periodic direction D2 (Y direction). It is therefore also conceivable in the case of the blue light Bp that the polarization separation characteristics of the polarization separation element 52b are improved and the contrast performance of the liquid crystal light valve 60b is enhanced accordingly in the half-blocked state shown in FIG. 3B as compared with those in the opened state shown in FIG. 3A, as in the description of the polarization separation element 52g.

The light combining section 70 is formed by bonding four rectangular prisms and thus has a substantially square shape when viewed from above. A pair of dichroic mirrors 71a and 71b are formed as combined surfaces along the interfaces between the bonded rectangular prisms. The dichroic mirrors 71a and 71b intersect each other and form an X-like shape, and the intersection axis 71c thereof extends in the Z direction. The dichroic mirrors 71a and 71b are formed of dielectric multilayer films having different characteristics. That is, one of the dichroic mirrors, the first dichroic mirror 71a, reflects red light LR (equals the red light Rs), and the other one, the second dichroic mirror 71b, reflects blue light LB (equals the blue light Bs). In the light combining section 70, green light LG modulated in the liquid crystal light valve 60g (equals the green light Gs whose direction of polarization has been changed after passing through a half-wave plate) passes through the first and second dichroic mirrors 71a, 71b and travels straight in the X direction. The red light LR modulated in the liquid crystal light valve 60r is reflected off the first dichroic mirror 71a, so that the optical path of the red light LR is deflected, and outputted in the X direction. The blue light LB modulated in the liquid crystal light valve 60b is reflected off the second dichroic mirror 71b, so that the optical path of the blue light LB is deflected, and outputted in the X direction. The color light fluxes LG, LB, and LR are then combined on the light-exiting side of the light combining section 70. Color combination is thus carried out. A half-wave plate 56 is disposed between the light combining section 70 and the liquid crystal panel 61g for G light. In this case, the green light LG incident on the dichroic mirrors 71a and 71b is converted into P-polarized light, whereby the color light fluxes LG, LR, and LB can be combined in the light combining section 70 at high efficiency and hence color unevenness can be suppressed.

The projection system 80 projects the color image light combined in the light combining section 70 on a screen (not shown) at a desired magnification. That is, color video images or color still images corresponding to the image signals or drive signals inputted to the liquid crystal panels 61g, 61r, and 61b are projected on the screen at a desired magnification.

The control unit 90 includes an image processor 91 to which video signals or other external image signals are inputted, a panel driver 92 that drives the liquid crystal light valves 60g, 60r, and 60b based on outputs from the image processor 91, a light level adjuster driver 93 that electrically drives the light level adjuster 19, and a main controller 99 that controls the actions of the circuits described above, such as the image processor 91.

In the control unit 90, the image processor 91 can perform a variety of corrections, including color correction and distortion correction, on the inputted external image signals and form image signals used to display character and other information in place of the external image signal or superimposed thereon.

The panel driver 92 produces drive signals used to adjust the states of the liquid crystal light valves 60g, 60r, and 60b based on the image signals having undergone image processing in the image processor 91 and having been outputted therefrom. In this way, the liquid crystal light valves 60g, 60r, and 60b can form images in the form of transmittance distribution corresponding to the image signals inputted from the image processor 91.

The light level adjuster driver 93 operates the light level adjuster 19 to increase or decrease the distance in the Z direction between the light blockers 19a and 19b, that is, the size of the opening OP.

The main controller 99 is formed of a microcomputer and operates based on a program prepared as appropriate for controlling the image processor 91 and other components. The main controller 99 can instruct the image processor 91 to adjust the light level by increasing or decreasing the amount of illumination light in accordance with the projection environment. Specifically, when the projection environment is dark, for example, the main controller 99 operates the image processor 91 and the light level adjuster driver 93 as appropriate to set the light level adjuster 19 in a relatively closed state so that the brightness of the captured image is reduced but the contrast thereof is increased. Conversely, when the projection environment is bright, the main controller 99 operates the image processor 91 and the light level adjuster driver 93 as appropriate to set the light level adjuster 19 in a relatively opened state so that the brightness of captured image is increased at a price of contrast to some extent. In this way, high-contrast, high-quality images in both dynamic and stationary senses can be projected.

FIGS. 3C and 3D show a variation of the light level adjuster 19 shown in FIGS. 3A and 3B. FIG. 3C shows an opened state, and FIG. 3D shows a half-blocked state. In this case, a pair of light blockers 119a and 119b that form a light level adjuster 119 have edges EG and EG that are not straight lines parallel to the Y axis direction but are convex curves. Now, let a width Z of the opening OP of the light level adjuster 119 be the distance between the edges EG and EG in the first direction (Z direction), which corresponds to the non-periodic direction D1. In the present variation, the width Z of the opening OP changes with the position in the second direction (Y direction). Specifically, the width Z of the opening OP increases as the position changes in the +Y direction.

Figure 4:
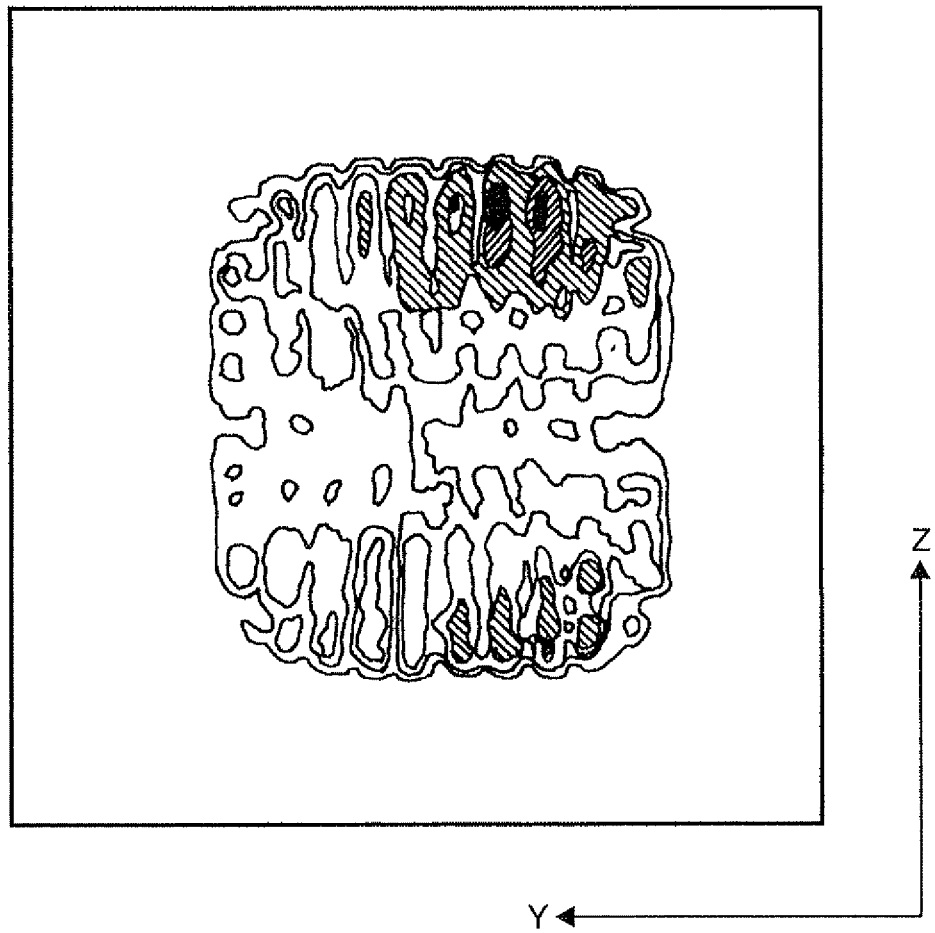
FIG. 4 shows the angular distribution of light that leaks through a liquid crystal light valve.

A description will be made of the reason why the width Z of the opening OP of the light level adjuster 119 is changed with the position in the second direction (Y direction). FIG. 4 describes the angular distribution of the light that leaks through the cleanup polarizer 55g disposed in the optical path OP1, for example, when a fully black image is displayed. FIG. 4 shows that even when the liquid crystal light valve 60g has ideal performance, the amount of light flux that leaks through the cleanup polarizer 55g tends to increase when the light flux is inclined toward the −Y direction on the downstream side of the optical path. To reduce the amount of light flux that leaks through the cleanup polarizer 55g when the light flux is inclined toward the −Y direction on the downstream side of the optical path, the width of the opening OP in the first direction (Z direction) on the −Y side of the light level adjuster 119 may be relatively narrowed in the present variation in consideration of the image reversing actions due to the reflection at the first dichroic mirror 21a, the optical-path deflecting mirror 23a, and the dichroic mirror 22 so that the amount of light flux that leaks through the cleanup polarizer 55g when the light flux is inclined toward the −Y direction on the downstream side of the optical path decreases. That is, using the light blockers 119a and 119b having the shape shown in FIG. 3C achieves illumination in which light leakage inherently less depend on angle and hence a high-contrast image projection. Further, changing the state of the light blockers 119a and 119b shown in FIG. 3C to a closed state shown in FIG. 3D allows the dependence of light leakage on angle to be further lowered when the amount of light is attenuated, whereby the contrast of a projected image can be significantly increased irrespective of the amount of light blockage.

The above description relates to the liquid crystal light valve 60g for G light, and the same discussion applies to the liquid crystal light valve 60r for R light. That is, even when the liquid crystal light valve 60r has ideal performance, the amount of light flux that leaks through the cleanup polarizer 55r disposed in the optical path OP2 tends to increase when a fully black image is displayed and the light flux is inclined toward the +Y direction on the downstream side of the optical path. Using the light level adjuster 119 shown in FIG. 3C allows the dependence of the light leakage on angle to be further lowered in the present variation in consideration of the image reversing actions due to the reflection at the first dichroic mirror 21a and the optical-path deflecting mirror 23a so that the amount of light flux that leaks through the cleanup polarizer 55r when the light flux is inclined toward the +Y direction on the downstream side of the optical path decreases, whereby a significantly high-contrast image can be projected irrespective of the amount of light level adjustment.

Measures taken for the liquid crystal light valve 60b for B light are different from those taken for the liquid crystal light valve 60g for G light. That is, when a fully black image is displayed, the amount of light flux that leaks through the cleanup polarizer 55b tends to increase when the light flux is inclined toward the −Y direction on the downstream side of the optical path. To reduce the amount of light flux that leaks through the cleanup polarizer 55b when the light flux is inclined toward the −Y direction on the downstream side of the optical path, reversing the light blockers 119a and 119b, which form the light level adjuster 119 shown in FIG. 3C, with respect to the Y direction and using the thus reversed light blockers in consideration of the image reversing actions due to the reflection at the second dichroic mirror 21b and the optical-path deflecting mirror 23b theoretically achieve illumination in which light leakage less depends on angle. The fact that the illuminator 20 common to the green, red, and blue colors is used, however, causes the liquid crystal light valve 60b for B light to still have dependence of light leakage on angle in the illustrated configuration of the color separation/light guiding system 40. It is noted, however, that since the spectral luminous efficiency of human eye is lower for blue light than for green light and other color light fluxes, degradation in contrast is not so noticeable. When the liquid crystal light valve 60g for G light and other liquid crystal light valves provide high contrast, a combined color image has high contrast.

Figure 5:
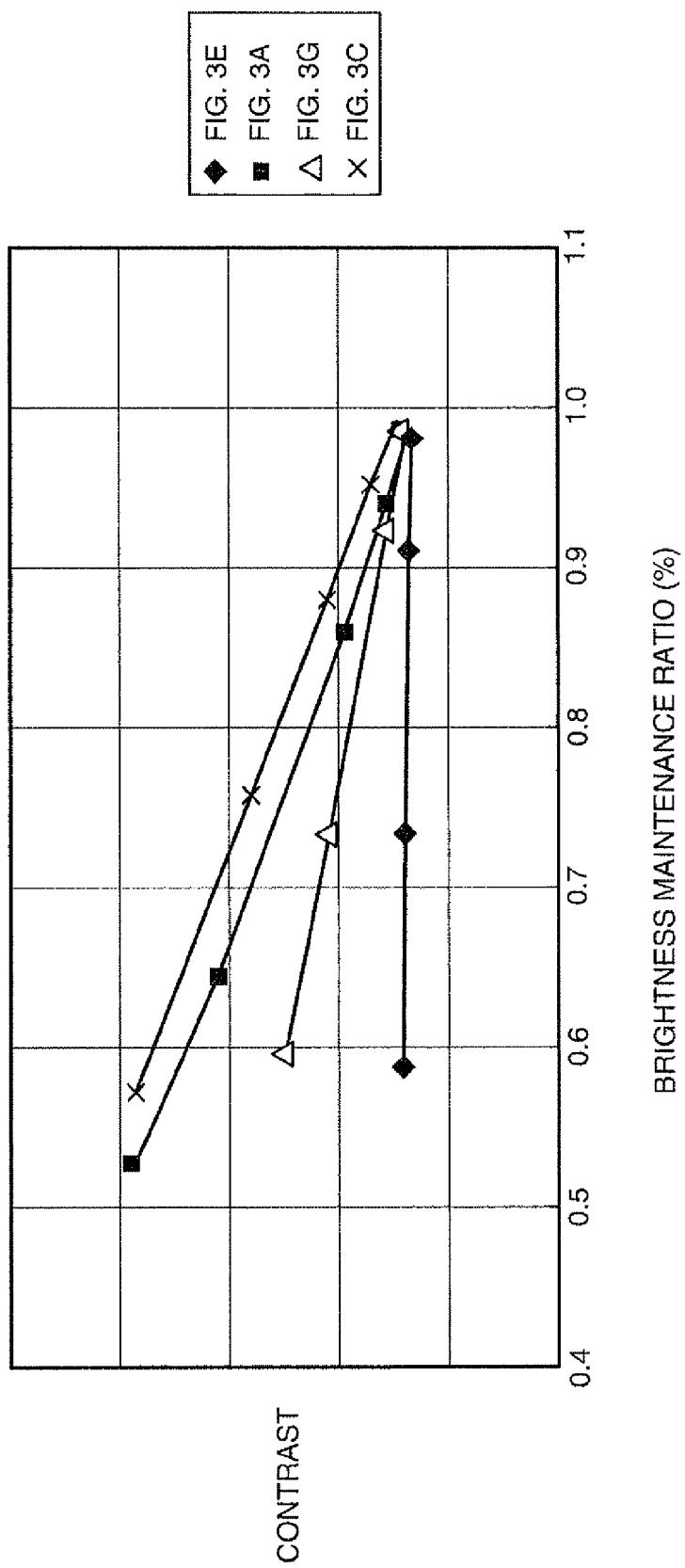
FIG. 5 describes the relationship between contrast and opening/closing actions of light blockers of the four types shown in FIGS. 3A to 3H.

FIG. 5 shows graphs for describing the relationship between light level adjustment and contrast when the light level adjustment is carried out by using the light level adjuster 19 shown in FIG. 3A and the light level adjuster 119 shown in FIG. 3C. In the graphs, the symbols "■" represent change in contrast achieved by the light level adjuster 19 in FIG. 3A, and the symbols "x" represent change in contrast achieved by the light level adjuster 119 in FIG. 3C. Further, in the graphs, the symbols "♦" represent change in contrast in Comparative Example 1, which will be described later, and the symbols "Δ" represent change in contrast in Comparative Example 2, which will be described later.

FIGS. 3E and 3F show a light level adjuster in Comparative Example 1. The edges EG and EG of a pair of light blockers 4a and 4b that form a light level adjuster 4 in Comparative Example 1 are straight lines parallel to the Z direction, and the distance between the edges EG and EG in the Y direction changes. FIGS. 3G and 3H show a light level adjuster in Comparative Example 2. The edge EG of a light blocker 5a that forms a light level adjuster 5 in Comparative Example 2 is a circle that uniformly changes in the Y and Z directions. In this case, the diameter of the edge EG changes.

As clearly seen from the graphs shown in FIG. 5, the light level adjuster 119 shown in FIG. 3C and other figures provides the highest contrast across the horizontal axis, and the light level adjuster 19 shown in FIG. 3A and other figures also provides high contrast across the horizontal axis. The contrast achieved by the light level adjuster 5 shown in FIG. 3G tends to slightly increase as the amount of light blockage increases probably because there are no corners, but the contrast achieved by the light level adjuster 4 shown in FIG. 3E does not increase even when the amount of light blockage increases.

As clearly indicated in the above description, according to the projector 100 of the present embodiment, the illuminator 20 emits illumination light IL whose angular distribution in the first direction (Z direction) is smaller than the angular distribution in the second direction (Y direction). Further, the polarization separation elements 52g, 52r, and 52b, each of which is a structural birefringent polarization separation element, are disposed in such a way that the non-periodic direction D1 thereof is parallel to the first direction (Z direction). As a result, the illumination light IL (Gp, Rp, and Bp) to be incident on the polarization separation elements 52g, 52r, and 52b has an angular distribution in the first direction, in which the polarization separation characteristics of the polarization separation elements 52g, 52r, and 52b relatively highly depend on angle, narrower than the angular distribution in the second direction, in which the polarization separation characteristics of the polarization separation elements 52g, 52r, and 52b relatively less depend on angle. The polarization separation elements 52g, 52r, and 52b can therefore have excellent polarization separation characteristics and light leakage through the polarization separation elements 52g, 52r, and 52b and other components can be reduced accordingly, whereby the contrast of a projected image can be increased. Further, when the light level adjuster 19 or any of the other light level adjusters is operated to change the state thereof, through which the illumination light IL to be incident on the polarization separation elements 52g, 52r, and 52b passes, from the opened state to the half-blocked state, the angular distribution of the illumination light IL in the first direction becomes smaller than the angular distribution in the second direction, whereby the performance of the liquid crystal light valves 60g, 60r, and 60b in terms of contrast is greatly enhanced as the amount of light attenuation increases.

In the embodiment described above, the illuminator includes the light level adjuster 19 or 119 between the first and second lens arrays 15, 16. The light level adjuster 19 or 119 may alternatively be disposed between the second lens array 16 and the polarization converter to achieve the same advantageous effect. Still alternatively, the light level adjuster 19 or 119 may be disposed between the polarization converter 17 and the superimposing lens 18, and the same advantageous effect is provided in this case as well.

Outer frames 19d and 119d disposed around the light level adjusters 19 and 119 do not necessarily have rectangular openings shown in FIG. 3A to 3D but may alternatively have circular openings.

The light level adjusters 19 and 119 may be replaced with fixed diaphragms having fixed light blockers 19a, 19b, 119a, and 119b. In this case, any of the shapes shown in FIGS. 3A to 3D can provide improved contrast, as compared with a case where the opening OP has the same dimension in the Z and Y directions.

Second Embodiment

The configuration of the optical system of a projector according to a second embodiment will be described below. The projector of the second embodiment is a variation of the projector 100 of the first embodiment, and the portions that will not be particularly described are the same as those in the first embodiment.

Figure 6:
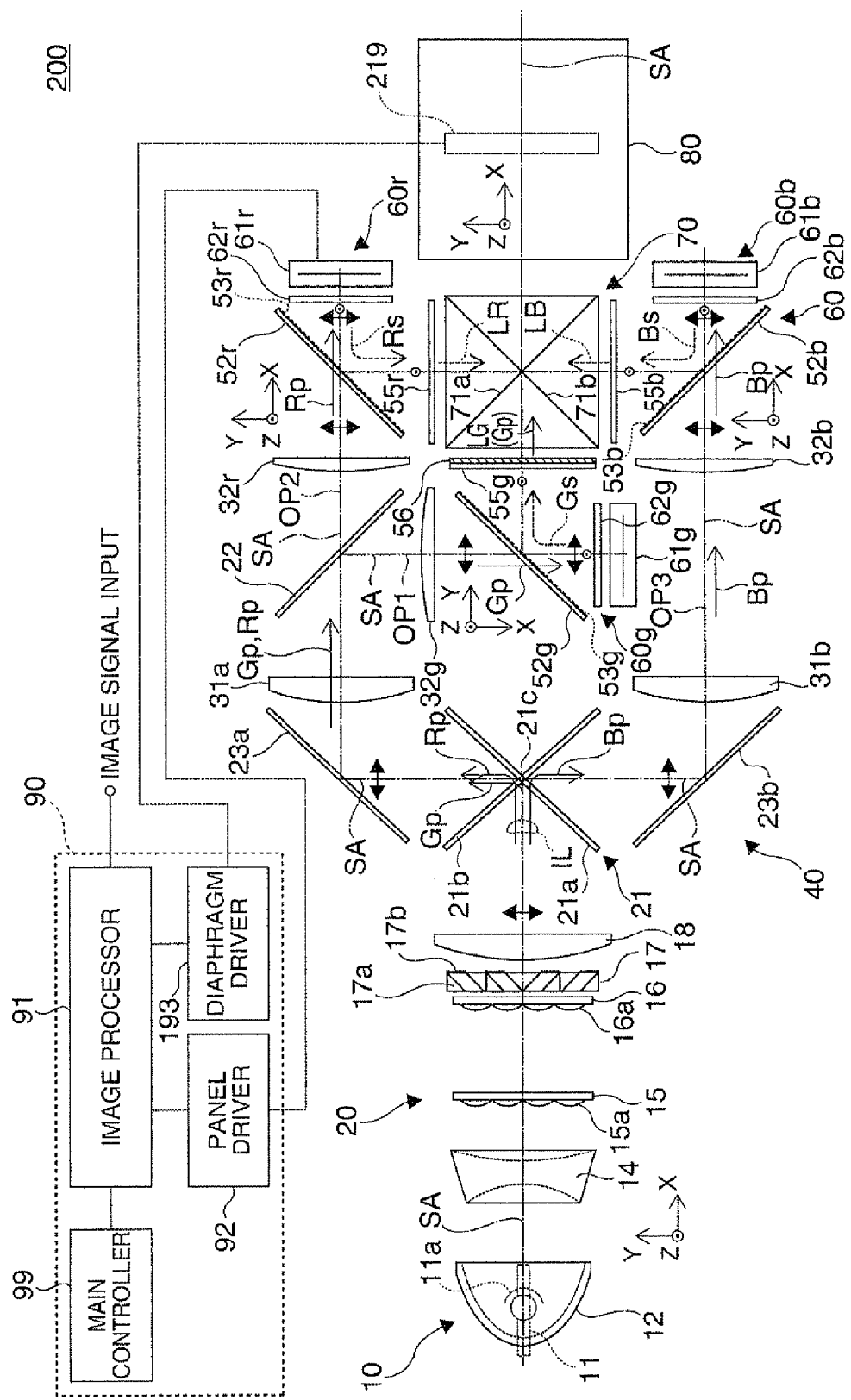
FIG. 6 is a plan view for describing the optical system of a projector according to a second embodiment.

FIG. 6 is a plan view for describing the configuration of the optical system of a projector according to the second embodiment. In a projector 200 of the present embodiment, the light level adjuster 19 in the illuminator 20 is replaced with a diaphragm 219 in the projection system 80. The diaphragm 219 is disposed in a pupil position or a light source image position in the projection system 80. Lens groups in the projection system 80 are omitted in FIG. 6 for ease of illustration.

Figure 7A:
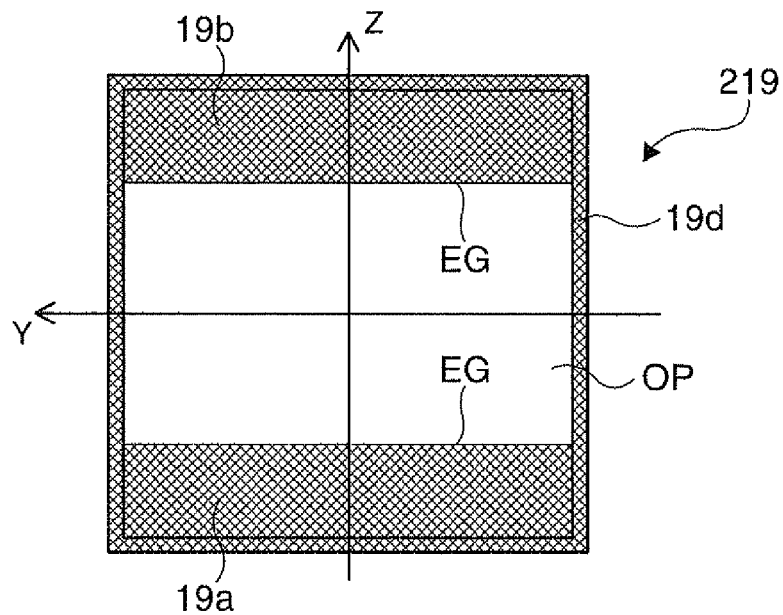
FIG. 7A describes the shape of a diaphragm, and FIG. 7B describes the shape of a diaphragm in a variation.

FIG. 7A describes the shape and other factors of the diaphragm 219. The diaphragm 219 has a pair of light blockers 19a and 19b and is opened or closed by moving the light blockers 19a and 19b away from each other or toward each other in the Z direction. The opening and closing actions of the diaphragm 219 are controlled by a diaphragm driver 193 that is operated under the control of the image processor 91 and other components. An outer frame 19d disposed around the diaphragm 219 does not necessarily have a rectangular opening but can have a circular opening.

When the diaphragm 219 is gradually closed, the angular distribution of a light flux passing through the diaphragm 219 in the first direction (Z direction), which is perpendicular to the system optical axis SA, decreases. That is, the angular distribution in the first direction (Z direction) of each of the color light fluxes LG, LR, and LB outputted from the liquid crystal light valves 60g, 60r, and 60b for the respective colors and projected through the projection system 80 decreases as the amount of light blockage increases, and the contrast achieved by each of the liquid crystal light valves 60g, 60r, and 60b is conceivably improved as compared with the contrast in the initial opened state. In this case, the shape of the opening OP formed by the light blockers 19a and 19b is not limited to a shape whose length in the first direction (Z direction) is shorter than the length in the second direction (Y direction) but can, for example, be a shape suitable for the characteristics of the angular field of view of the liquid crystal light valves 60g, 60r, and 60b, whereby the contrast of a projected image can be improved as the amount of light attenuation increases.

The diaphragm 219 is not necessarily a movable type in which the light blockers 19a and 19b, which form the diaphragm 219, are opened and closed, but can be a fixed diaphragm in which the light blockers 19a and 19b are not opened or closed. That is, the light flux passing through the projection system 80 has an angular distribution in the first direction (Z direction), which is perpendicular to the system optical axis SA, smaller than the angular distribution in the second direction (Y direction), which is perpendicular to the system optical axis SA and the first direction (Z direction). In this case, the color light fluxes LG, LR, and LB outputted from the liquid crystal light valves 60g, 60r, and 60b for the respective colors and projected through the projection system 80 have angular distributions in the first direction (Z direction) smaller than those in the second direction (Y direction). In this case, the contrast of an image projected through the projection system 80 is conceivably improved as compared with a case where the angular distribution in the first direction is equal to that in the second direction.

According to the projector 200 of the present embodiment, the polarization separation element 52g, which is a structural birefringent polarization separation element, is disposed in such a way that the non-periodic direction D1 thereof extends in the first direction (Z direction). Further, the diaphragm 219 in the projection system 80 transmits an image light flux whose angular distribution in the first direction (Z direction) is smaller than the angular distribution in the second direction (Y direction). The light flux having traveled via the polarization separation element 52g and entered the projection system 80 is therefore attenuated by the diaphragm 219 in such a way that the angular distribution in the first direction (Z direction), in which the polarization separation characteristics of the polarization separation elements 52g, 52r, and 52b relatively highly depend on angle, is narrower than the angular distribution in the second direction (Y direction), in which the polarization separation characteristics of the polarization separation elements 52g, 52r, and 52b relatively less depend on angle. In this way, when a fully black image is displayed, light leakage due to the dependence of the polarization separation characteristics of the polarization separation element 52g on angle less affects the displayed fully black image, whereby the contrast of the projected image can be increased. Further, when the diaphragm 219 is operated to change the state thereof from the opened state to the half-blocked state, an image light flux passing through the projection system 80 has an angular distribution in the first direction smaller than the angular distribution in the second direction, whereby the contrast of an image projected through the projection system 80 is greatly improved as the amount of light attenuation increases.

Figure 7B:
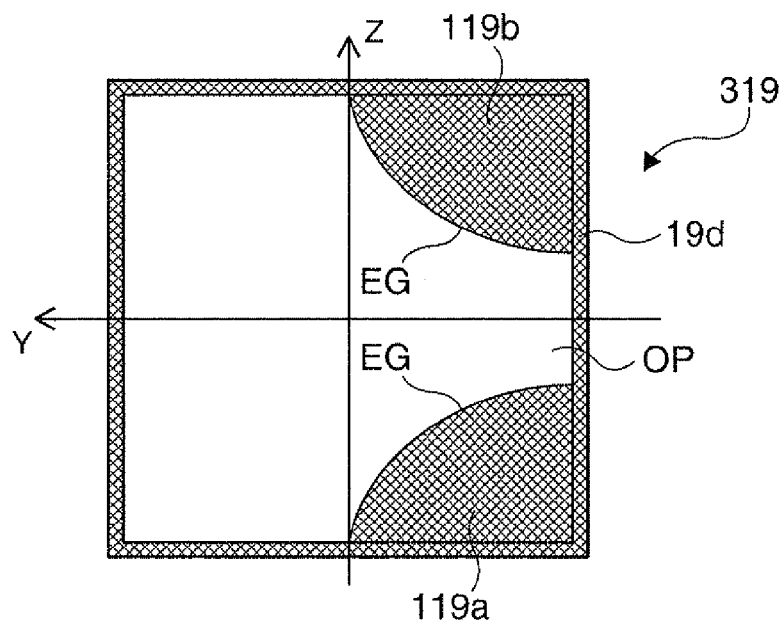

FIG. 7B shows a variation of the diaphragm 219 shown in FIG. 7A. In this case, a pair of light blockers 119a and 119b that form a diaphragm 319 have edges EG and EG that are not straight lines parallel to the Y axis direction but are convex curves, as in the case shown in FIG. 3C. Now, let a width Z of the opening OP of the light level adjuster 319 be the distance between the edges EG and EG in the first direction (Z direction), which corresponds to the non-periodic direction D1. The width Z of the opening OP changes with the position in the second direction (Y direction). Specifically, the width Z of the opening OP increases with the position in the +Y direction for the same reason described with reference to FIGS. 3C and 3D, whereby the contrast of an image projected through the projection system 80 can be improved.

While the invention has been described with reference to the above embodiments, the invention is not limited thereto. The invention can be implemented in a variety of aspects to the extent that they do not depart from the substance of the invention. For example, the following variations can be employed.

That is, in the embodiments described above, the green light Gp is introduced into the first optical path OP1, the red light Rp is introduced into the second optical path OP2, and the blue light Bp is introduced into the third optical path OP3. The combination of the optical paths and the colors described above can be changed. For example, the green light Gp can be introduced into the first optical path OP1, the blue light Bp can be introduced into the second optical path OP2, and the red light Rp can be introduced into the third optical path OP3.

Further, the way the initial optical path is divided into the optical paths OP1, OP2, and OP3 in the color separation/light guiding section 40 is not limited to the way shown in the above embodiments but can be a variety of other ways.

In the projector 100 of the first embodiment described above, the polarization separation elements 52g, 52r, and 52b in the liquid crystal light valves 60g, 60r, and 60b are wire-grid polarization separation elements. The polarization separation elements 52g, 52r, and 52b may alternatively be photonic crystal-based optical element produced by stacking a plurality of three-dimensional dielectric layers or any other suitable structural birefringent optical element.

In the projector 100 of the first embodiment described above, the opening OP, which is formed by the light blockers 19a and 19b of the light level adjuster 19, has a rectangular shape. The opening OP may alternatively have, for example, an elliptical shape. In this case as well, the contrast of an image can be adjusted by opening or closing the opening OP so that the distance in the Z direction is increased or decreased with the distance in the Y direction maintained.

In the projectors 100 and 200 of the embodiments described above, the light level adjusters 19, 119, 219 and 319 always make the angular distribution of the illumination light IL in the first direction smaller than the angular distribution in the second direction. Alternatively, the light level adjuster 19 is not provided, but a light source apparatus that outputs illumination light whose angular distribution in the first direction is smaller than that in the second direction can be employed. Instead of modifying the light source apparatus, the shape of at least one of the light source apparatus, the concave lens 14, and the first and second lens arrays can be modified as appropriate to allow the illuminator to output illumination light whose angular distribution in the first direction is smaller than that in the second direction. The illuminator that outputs illumination light whose angular distribution in the first direction is smaller than that in the second direction can be combined with the light level adjuster 19 or 119 or the diaphragm 219 or 319.

In the projector 100 of the first embodiment described above, the Z direction is the first direction in the illuminator 20. The Y direction may alternatively be the first direction. In this case, the non-periodic direction D1 and the inclination direction of each of the polarization separation elements 52g, 52r, and 52b are changed as appropriate.

In the projector 100 of the first embodiment described above, no wave plate is disposed in the color separation/light guiding section 40. A wave plate can be disposed to reverse the S-polarized light and the P-polarized light, and the non-periodic direction D1 and the inclination direction of each of the polarization separation elements 52g, 52r, and 52b can be changed accordingly as appropriate.

In the projectors 100 and 200 of the embodiments described above, the illuminator 20 is formed of the light source apparatus 10, the pair of lens arrays 15 and 16, the polarization converter 17, the superimposing lens 18, and other components, but the lens arrays 15 and 16 and other components can be omitted. Further, the light source apparatus 10 can be replaced with an LED or any other suitable light source.

In the embodiments described above, only the projectors 100 and 200 using the three liquid crystal light valves 60g, 60r, and 60b are presented by way of example. The invention is also applicable to a projector using two liquid crystal light valves and a projector using four or more liquid crystal light valves.

In the embodiments described above, only a front-projection projector in which an image is projected from the viewer's side, where the viewer observes the screen, is presented by way of example, but the invention is also applicable to a rear-projection projector in which an image is projected from the side that is opposite the viewer's side, where the viewer observes the screen.

What is claimed is:

1. A projector comprising:
   an illuminator that outputs light having a central axis; and
   a light modulator including a liquid crystal panel and a structural birefringent polarization separation element having a polarization separation surface inclined away from the central axis of the light, the light modulator modulating the light from the illuminator,
   the light outputted from the illuminator having an angular distribution in a first direction that is perpendicular to the central axis of the light and an angular distribution in a second direction that is perpendicular to the first direction and to the central axis of the light, the angular distribution in the first direction being smaller than the angular distribution in the second direction, and the polarization separation surface of the structural birefringent polarization separation element having a structure that is not periodic along the first direction but is periodic along the second direction, wherein the illuminator includes a light level adjuster having a movable light blocker that adjusts the angular distribution of the light and wherein the light blocker has an opening with a width that increases in the first direction as the position in the opening changes from one side to an another side of the light blocker along the second direction, and the opening is asymmetrical in the second direction.

2. The projector according to claim 1, further comprising:
a projection system that projects the light modulated by the light modulator;
a plurality of light modulators in addition to the light modulator;
a color separation/light guiding section that separates the light outputted from the illuminator into red light, green light and blue light, guides the green light to the light modulator, and guides the red light and the blue light to the plurality of other light modulators; and
a light combining section that combines the green light modulated by the light modulator with the red light and the blue light modulated by the plurality of other light modulators and causes the combined light to enter the projection system.

3. The projector according to claim 1, further comprising:
a projection system that projects the light modulated by the light modulator.

4. The projector according to claim 1, wherein the polarization separation surface is a striped shaped grid.

5. The projector according to claim 1, wherein the illuminator includes the light level adjuster having a pair of light blockers, and the light level adjuster opening changes by moving the light blockers either away from or toward each other in the first direction.

6. The projector according to claim 5, wherein under the condition that the light level adjuster opening width gradually decreases, the angular distribution in the first direction gradually decreases, which increases a difference in angular distribution between the first and second directions.

7. A projector comprising:
an illuminator that outputs light having a central axis;
a light modulator including a liquid crystal panel and a structural birefringent polarization separation element having a polarization separation surface inclined away from the central axis of the light, the light modulator modulating the light from the illuminator; and
a projection system that projects the light modulated by the light modulator as image light,
the polarization separation surface of the structural birefringent polarization separation element having a structure that is not periodic along a first direction, but is periodic along a second direction, the first direction being perpendicular to the central axis of the light, the second direction being perpendicular to the central axis of the light and the first direction,
wherein the illuminator includes a light level adjuster having a movable light blocker that adjusts the angular distribution of the light, the light outputted from the illuminator having an angular distribution in a first direction that is perpendicular to the central axis of the light and an angular distribution in a second direction that is perpendicular to the first direction and to the central axis of the light, the angular distribution in the first direction being smaller than the angular distribution in the second direction, and
wherein the light blocker has an opening with a width that increases in the first direction as the position in the opening changes from one side to an other side of the light blocker along the second direction, and the opening is asymmetrical in the second direction.

* * * * *